US007126109B2

(12) United States Patent
Goldman et al.

(10) Patent No.: US 7,126,109 B2
(45) Date of Patent: Oct. 24, 2006

(54) ENCODER SCALE ERROR COMPENSATION EMPLOYING COMPARISON AMONG MULTIPLE DETECTORS

(75) Inventors: Andrew Goldman, Waltham, MA (US); William G. Thorburn, Whitinsville, MA (US)

(73) Assignee: GSI Group Corporation, Billerica, MA (US)

( * ) Notice: Subject to any disclaimer, the term of this patent is extended or adjusted under 35 U.S.C. 154(b) by 74 days.

(21) Appl. No.: 10/867,096

(22) Filed: Jun. 14, 2004

(65) Prior Publication Data

US 2005/0274878 A1 Dec. 15, 2005

(51) Int. Cl.
*G01D 5/34* (2006.01)

(52) U.S. Cl. .................... 250/231.14; 250/231.16; 250/237 G; 356/614

(58) Field of Classification Search ........... 250/231.13, 250/231.14, 231.16, 237 R, 237 G; 356/614–618; 33/1 PT; 341/13
See application file for complete search history.

(56) References Cited

U.S. PATENT DOCUMENTS

| 4,580,046 | A | * | 4/1986 | Sasaki et al. | .......... 250/231.16 |
| 4,631,520 | A | | 12/1986 | Wingate | ................. 340/347 |
| 5,066,129 | A | * | 11/1991 | Matsui | ................. 356/499 |
| 5,438,330 | A | * | 8/1995 | Yamazaki et al. | ............ 341/11 |
| 6,029,363 | A | | 2/2000 | Masreliez et al. | ............ 33/706 |
| 6,686,585 | B1 | | 2/2004 | Grimes et al. | ......... 250/231.13 |
| 6,828,783 | B1 | * | 12/2004 | Schroter et al. | ....... 324/207.25 |

FOREIGN PATENT DOCUMENTS

WO     WO 03/055077 A2     7/2003

* cited by examiner

*Primary Examiner*—Stephone B. Allen
*Assistant Examiner*—Patrick J. Lee
(74) *Attorney, Agent, or Firm*—BainwoodHuang

(57) ABSTRACT

An encoder calculates position error values and applies compensation values to encoder position measurements in-situ. The encoder includes a scale and a multi-section detector for detecting a spatially periodic pattern, such as an optical interference pattern, produced by the scale. The detector includes spatially separated first and second sections. A signal processor estimates respective phase values from detector sections and calculates a phase difference reflecting a spatial position error in the scale. A compensation value is calculated from the phase difference and included in the estimate of the scale position to compensate for this spatial position error. The compensation values may be calculated and used on the fly, or calculated and saved during an in-situ calibration operation and then utilized during normal operation to compensate uncorrected measurements.

36 Claims, 10 Drawing Sheets

ENCODER SCALE ERROR COMPENSATION EMPLOYING COMPARISON AMONG MULTIPLE DETECTORS

BACKGROUND OF THE INVENTION

The present invention is related to the field of position encoders including diffractive optical position encoders.

It is well known in the art that the accuracy of a scale-based optical encoder is ultimately limited by the perfection of the scale itself. In diffractive optical encoders, various scale errors affect the position, period, straightness, and intensity profile of the interference fringes, which in turn affect the accuracy of the phase measurement performed by the encoder.

A typical approach for reducing the significance of scale errors is to perform a calibration measurement of the scale, either at the factory or in the field, and to apply the calibration to subsequent operational measurements. Usually the scale position is measured relative to an encoder sensor head while being translated on a stage whose position is independently sampled with a second, known good position measuring system (the "reference" system), such as an interferometer. In general, measurements are taken at intervals along the scale grating. Any differences between the position as measured by the encoder and the position as measured by the reference sensor are ascribed to the scale under test. Generally, these recorded differences are supplied to the user of the scale as a hard copy printout and/or as a digital file. Often the digital file can be incorporated as a look-up table (LUT) in an electronic processor used in conjunction with the encoder. The LUT is used to convert operational measurements based on the scale into more accurate compensated measurements.

Although the above compensation technique can be quite accurate, it has the drawback that the calibration is performed outside the system in which the encoder is used, and thus necessarily cannot capture errors that depend on the operating environment, such as temperature-related scale errors. Also, it is cumbersome or practically impossible to perform any re-calibration of the encoder once it is installed in an operating system, because of the need to connect it to a separate measuring system such as an interferometer.

An alternative prior art approach for compensating for scale errors is to apply a single, linear correction to the operational measurements. To the extent that the largest component of the error in the scale can be characterized by a linear function, this approach has proved valuable. However, one difficulty with this approach has been the need to apply a continuous linear correction in the form of a discontinuous staircase function. This problem was addressed by Wingate in U.S. Pat. No. 4,631,520 entitled Position Encoder Compensation System, wherein an essentially continuous linear function is generated based on an approximation of the distance beyond step transitions. This linear correction approach eliminates the need for a large LUT, but it also compromises the resultant performance of the measurement system by ignoring all the non-linear errors.

One general difficulty with these compensation schemes is the need to perform a calibration measurement with an independent, known good reference system. Consequently, calibration generally cannot be performed in-situ, as mentioned above, and therefore these techniques cannot compensate for errors that arise only in-situ. There is a movement in the encoder industry toward the use of so-called tape gratings, which are encoder scales manufactured on thin, flexible substrates. The largest scale errors for tape gratings are generally created upon installation, and therefore an a-priori calibration at the factory is generally not effective.

It would be desirable to have an error compensation technique for encoders that addresses the problems arising from the prior art requirement for a separate known good position measuring system when calibrating encoder scales. Additionally, an improved technique would permit in-situ re-calibration of the encoder as may be necessary or desired during operation.

BRIEF SUMMARY OF THE INVENTION

In accordance with the present invention, an optical encoder is disclosed that calculates position error values and applies corresponding compensation values to encoder position measurements in-situ. In one embodiment, the compensation technique requires no lookup table and is performed on the fly during normal operation of the encoder. Alternative embodiments employ an in-situ calibration operation with a lookup table. The calibration operation can be repeated as often as may be desired in a deployed encoder system.

In general, the disclosed encoder includes a scale that produces a spatially periodic pattern, such as an optical interference pattern produced by selective transmission or reflection of light in an optical encoder. A multi-section detector is configured to detect multiple periods of the pattern. The detector includes spatially separated first and second sections.

A signal processor is operative in response to output signals from the detector to derive first and second measured phase values for the first and second detector sections respectively, the measured phase values being indicative of an uncorrected estimate of the position of the scale with respect to the detector. The signal processor further calculates a position error value based on the difference between the first and second measured phase values, and a compensation value from the position error value. The compensation value is combined with at least one of the first and second measured phase values to produce a corrected estimate of the position of the scale with respect to the detector.

In a first embodiment, the calculating and use of compensation values is done on the fly during normal encoder operation, providing for simplicity and low cost. Generally, an encoder of this first type is best suited for applications having relatively low resolution requirements. In embodiments of a second type, the compensation values are calculated and stored during an in-situ calibration operation, and then utilized to compensate measurements during normal operation. Each compensation value can be used to compensate encoder measurements in a range near a calibration point, and thus encoders according to these embodiments can be of higher resolution.

More particularly, one encoder of the second type calculates a compensation value by multiplying the position error value by $2\pi/S$, where S is a step size equal to the phase interval between adjacent correction points of the scale. The encoder produces the corrected estimate of the scale position at a given correction point (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

In another encoder of the second type, the compensation value is calculated as the sum of (the position error value and $2\pi$) divided by $2\pi$. The corrected estimate of the scale position at a given correction point is produced (1) when the scale position is moving away from a home position, by incrementing an immediately preceding estimate of the scale position by a value equal to the product of one least significant bit and the compensation value, and (2) when the scale position is moving towards the home position, by decrementing the immediately preceding estimate of the scale position by a value equal to the product of one least significant bit and the compensation value.

In yet another encoder of the second type, a given compensation value is calculated as a cumulative error value by summing the position error values from all correction points between a home position and the given correction point. In one variant of this encoder, the signal processor is operative during the calibration operation to produce a table of corrected estimates of the scale position as a function of measured positions of the scale position. The signal processor is further operative during normal operation, at each of a set of measured scale positions, to retrieve the corresponding corrected estimate of the scale position from the table. In another variant, the signal processor is operative during the calibration operation to produce data representing a function Z which is a curve-fit approximation of corrected estimates of the scale position as a function of measured positions of the scale position. The signal processor is operative during normal operation, at each of a set of measured scale positions, to multiply the measured scale position by a corresponding value of Z.

In yet another encoder of the second type, the signal processor is operative during the calibration operation to produce data representing a function Z which is a curve-fit approximation of the position error values as a function of measured positions of the scale position. During normal operation, at each of a set of measured scale positions, the signal processor produces a re-created position error value by multiplying the measured scale position by a corresponding value of Z, and calculates the compensation value by multiplying the re-created position error value by $2\pi/S$, where S is a step size equal to the phase interval between adjacent correction points of the scale. The corrected estimate of the scale position at a given correction point is then produced (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

In a variant of the above encoder, the compensation value is calculated as the sum of (the position error value and $2\pi$) divided by $2\pi$, and the corrected estimate of the scale position at a given correction point is produced (1) when the scale position is moving away from a home position, by incrementing an immediately preceding estimate of the scale position by a value equal to the product of one least significant bit and the compensation value, and (2) when the scale position is moving towards the home position, by decrementing the immediately preceding estimate of the scale position by a value equal to the product of one least significant bit and the compensation value.

The disclosed techniques are described primarily in the context of an optical interferometric encoder, but they are applicable to other types of encoders such as encoders employing geometric optics, magnetic encoders, inductive encoders, and other encoder types.

Other aspects, features, and advantages of the present invention will be apparent from the Detailed Description that follows.

BRIEF DESCRIPTION OF THE SEVERAL VIEWS OF THE DRAWINGS

The invention will be more fully understood by reference to the following Detailed Description of the invention in conjunction with the Drawing, of which.

DETAILED DESCRIPTION

Figure 1:
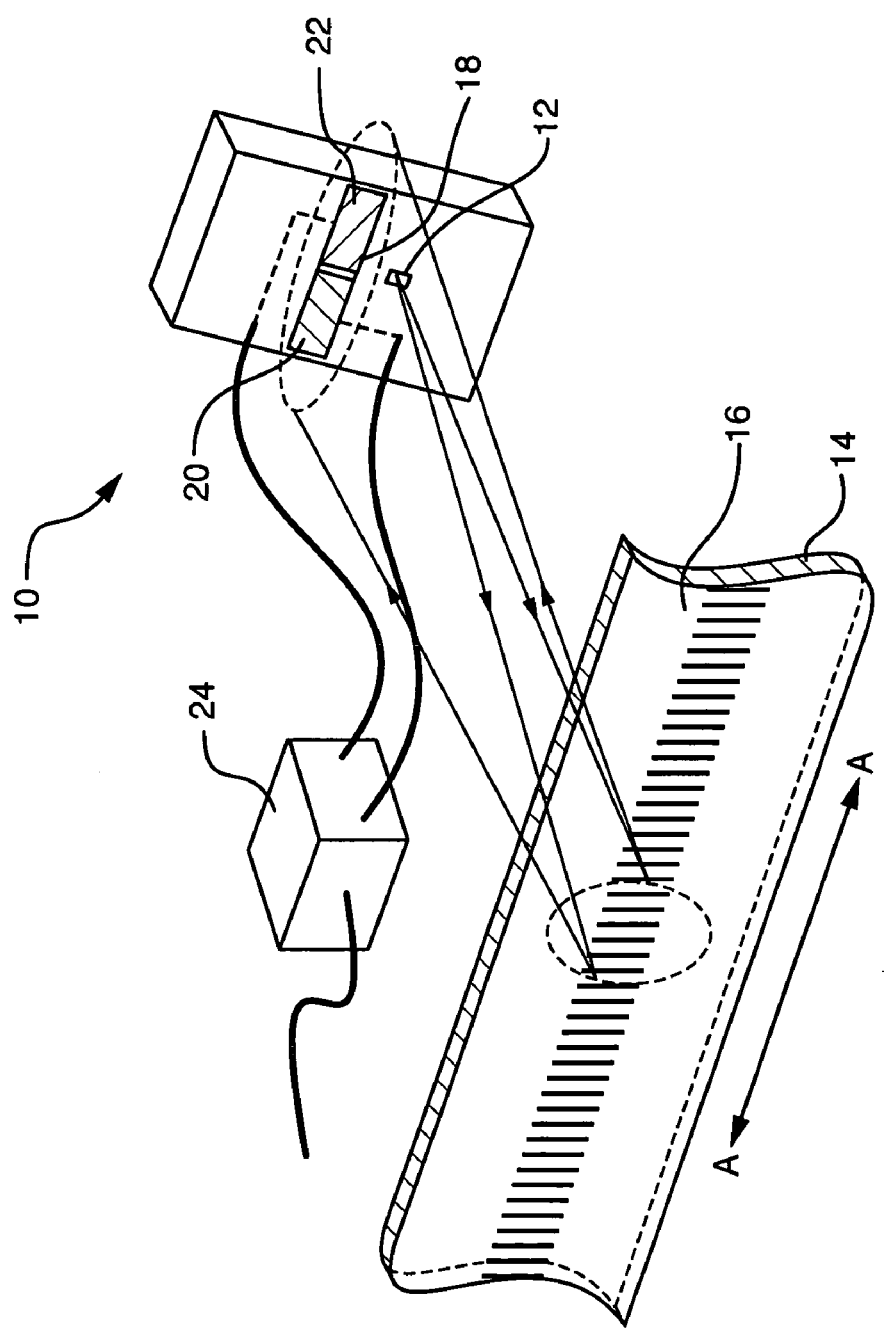
FIG. 1 is a schematic diagram of an optical encoder in accordance with the present invention.

In FIG. 1, sensor apparatus 10 is installed as part of a reflective, diffractive optical encoder. A source 12 illuminates a scale 14 on which a periodic, reflective diffraction grating 16 has been created. Light from the source 12 is reflectively diffracted from the scale 14 toward the sensor apparatus 10, which in the illustrated embodiment includes an optical detector 18. The diffraction grating 16 generates multiple orders of diffracted light which interfere with each other to form an optical fringe pattern (not illustrated) on the detector 18.

The fringe pattern is ideally a sinusoid characterized by a period P. Conceptually, when the scale 14 moves laterally relative to the detector 18 along the direction indicated by double headed arrow A-A, the fringe pattern moves a proportional distance on the face of detector 18. An accurate measurement of the changes in the phase of the fringe pattern is a proportional measurement of the movement of the scale 14. As discussed above, measurement errors can arise due to imperfections of the scale 14, such as inconsistent spacing of the lines of the diffraction grating 16 or deviations from ideal flatness of the surface facing the sensor apparatus 10.

The detector 18 is configured to have at least two separate sections 20 and 22, such that the optical fringe pattern is sampled at spatially displaced locations. That is, section 20 acts as an independent detector that samples the fringe pattern at one location, and section 22 acts as an independent detector that samples the fringe pattern at a slightly different location. As described below, it is preferable that each section 20 and 22 comprise a polyphase detector—that is, a detector capable of detecting at least two phase components of the periodic signal.

The samples from each section 20 and 22 are sent to an electronic processor 24 which calculates a fringe phase for each sample. The difference between the respective phases calculated for the sections 20 and 22 is calculated, and deviations from the expected values in the resulting differences are used to calculate and compensate for the errors in the fringe pattern periodicity. The resulting compensation improves the measurement accuracy of the instrument, in this example an optical encoder.

Figure 2:
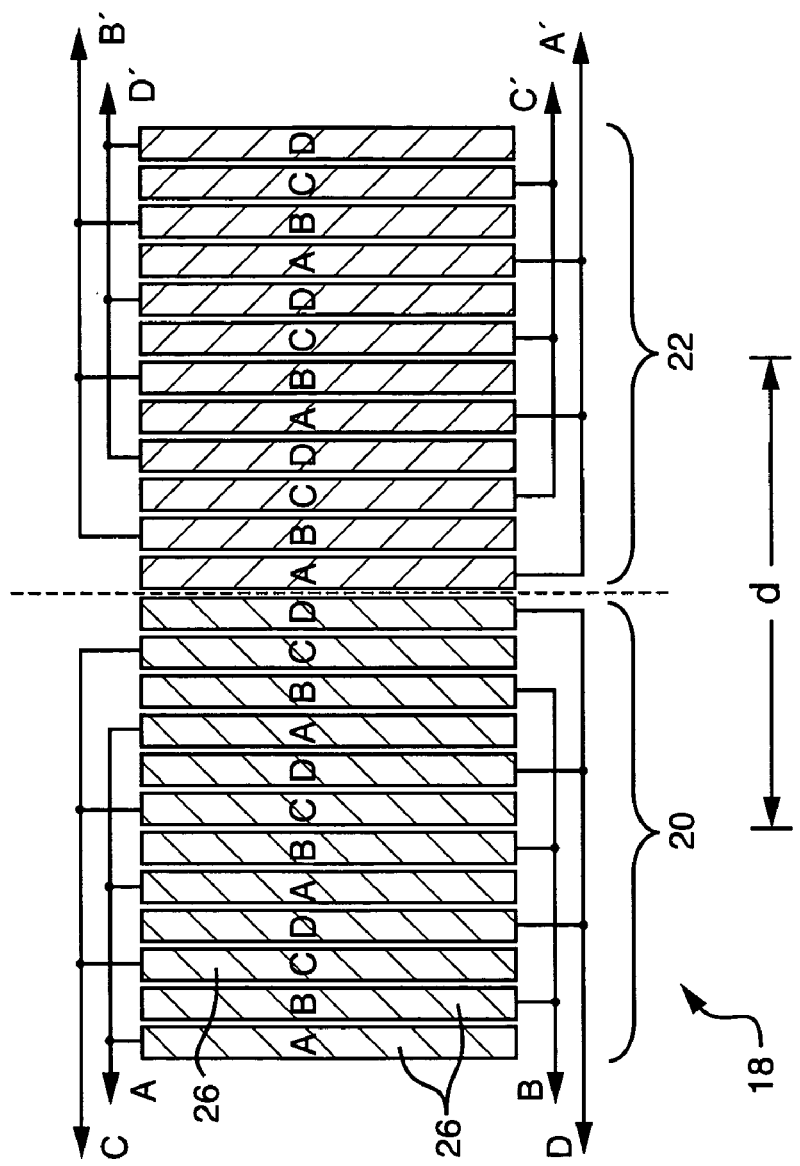
FIG. 2 is a schematic layout diagram of a first multi-section detector usable in the optical encoder of FIG. 1.
Figure 3:
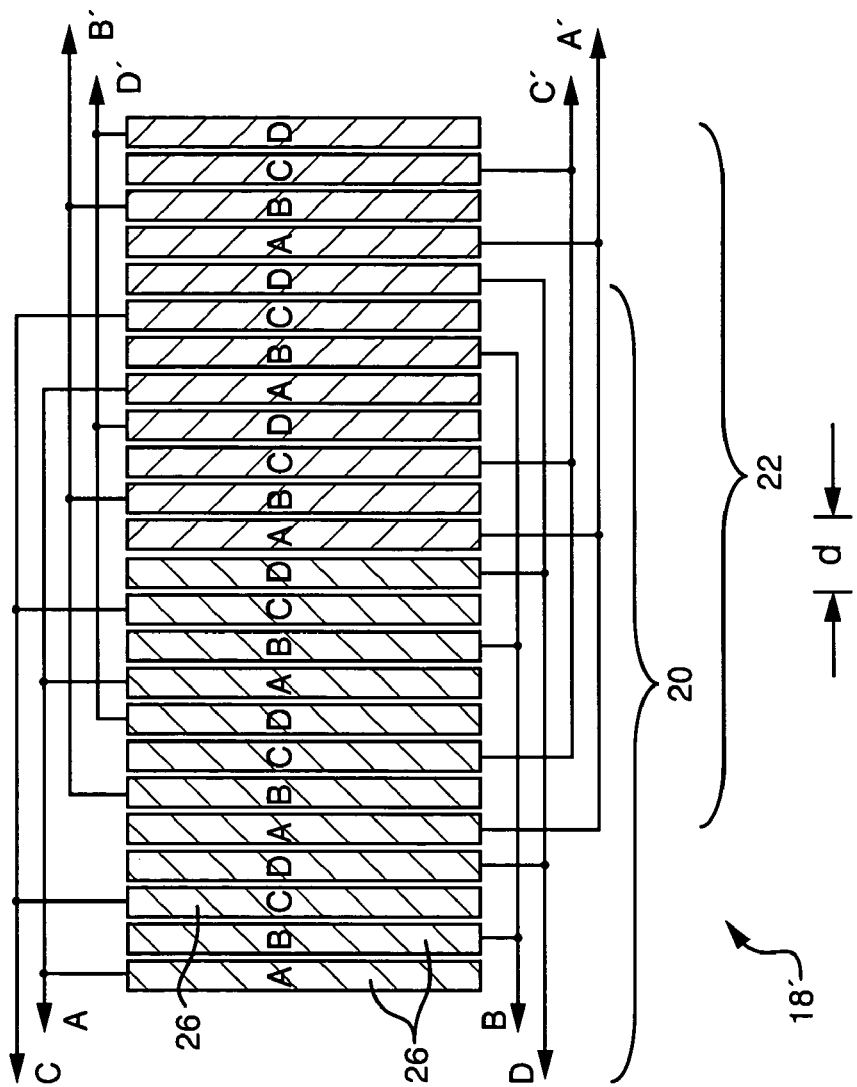
FIG. 3 is a schematic layout diagram of a second multi-section detector usable in the optical encoder of FIG. 1.

FIGS. 2 and 3 show alternative ways that the detector 18 can be implemented. Each section 20 and 22 of the detector 18 comprises a linear array of substantially identical photosensitive elements 26, each element being an elongated rectangle. The rectangular elements 26 are arrayed side-by-side in the "along-track" direction (i.e., the direction along which the signal varies periodically). In the illustrated embodiment, the elements 26 are combined in four interdigitated groups identified as A, B, C, and D. All of the elements 26 in a group are electrically connected together, as illustrated. The interdigitated groups form repeating sets {ABCD, ABCD, ABCD}, each of which is referred to as a "quad". It is typical that one period of the fringe pattern substantially covers one quad. In such a configuration, each group of elements (e.g. group A, group B, etc.) detects one of multiple phases of the periodic signal, and so the entire detector is therefore called a "polyphase" detector. It is not essential that the elements 26 be identical or perfectly repeating, nor must one fringe period substantially cover one quad. Alternative polyphase detectors may also be used.

Each detector section 20, 22 makes an independent measurement of the periodic signal. Typically the sections 20 and 22 are spatially separated. An example is shown in FIG. 2, in which section 20 of three groups resides on the left, and section 22 of three groups resides on the right. If the middle of each section is taken as its "location", then the sections 20 and 22 are separated by a distance d equal to the width of three quads. Overlapping or interleaved sections may also be used. An example of such a detector 18' is shown in FIG. 3, in which the first, third and fifth groups (proceeding left to right) are connected together to form one section 20, and the second, fourth and sixth groups form the other section 22. Such a configuration may be desirable in order to reduce the detector separation d and thereby achieve improved sampling of high spatial frequency errors. Generally, each section must be long enough to span at least one full period of the signal, and preferably spans an integer number of periods. Preferably, although not necessarily, the sections are the same length. Typically the sections are contiguous, although for measurements of very low spatial frequency errors, where the samples are best widely separated, non-contiguous sections may be preferred.

As previously mentioned, as the sinusoidal fringes move across each element 26, the element 26 generates a sinusoidal electrical output signal. The sinusoidal output signals of the elements 26 within a quad are phase-separated by integer multiples of 90 degrees. Thus, if the "A" element is referenced as the +sine signal, then the B element is the +cosine signal, the C element is the −sine signal, and the D element is the −cosine signal. Differential signals SIN and COS are created as SIN=(+sine)−(−sine), and COS=(+cosine)−(−cosine). The differential SIN and COS signal are used for interpolation. In general, $\theta$=ARCTAN(SIN/COS). A full optical fringe equals $2\pi$ radians.

In the illustrated embodiments, multiple quads per section 20, 22 are employed, so that the incremental movements are averaged over a number of optical fringes instead of just one. In alternative embodiments it may be desirable to employ only one quad per section.

In a typical interpolating encoder, position is sampled at time-based intervals, and then the change in position from the last reading is reported or stored accordingly. In the presently disclosed encoder, it is necessary to sample at specific positions, referred to as "correction points", either in addition to or in place of the time-based samples. One way to sample the position is by averaging the outputs of the sections 20 and 22 and then detecting when the SIN and COS of the averaged output has a zero crossing. These correspond to the four quarter-cycle positions (0°, 90°, 180°, and 270°) in each fringe cycle. Alternatively, the points at which |SIN|=|COS| can be detected, which correspond to the N/8 positions for N=1, 3, 5, and 7 (45°, 135°, 225°, and 315°). Other position sampling techniques can also be used. The basic requirement is that the average position be sampled accurately at equal position intervals along the scale.

Figure 4:
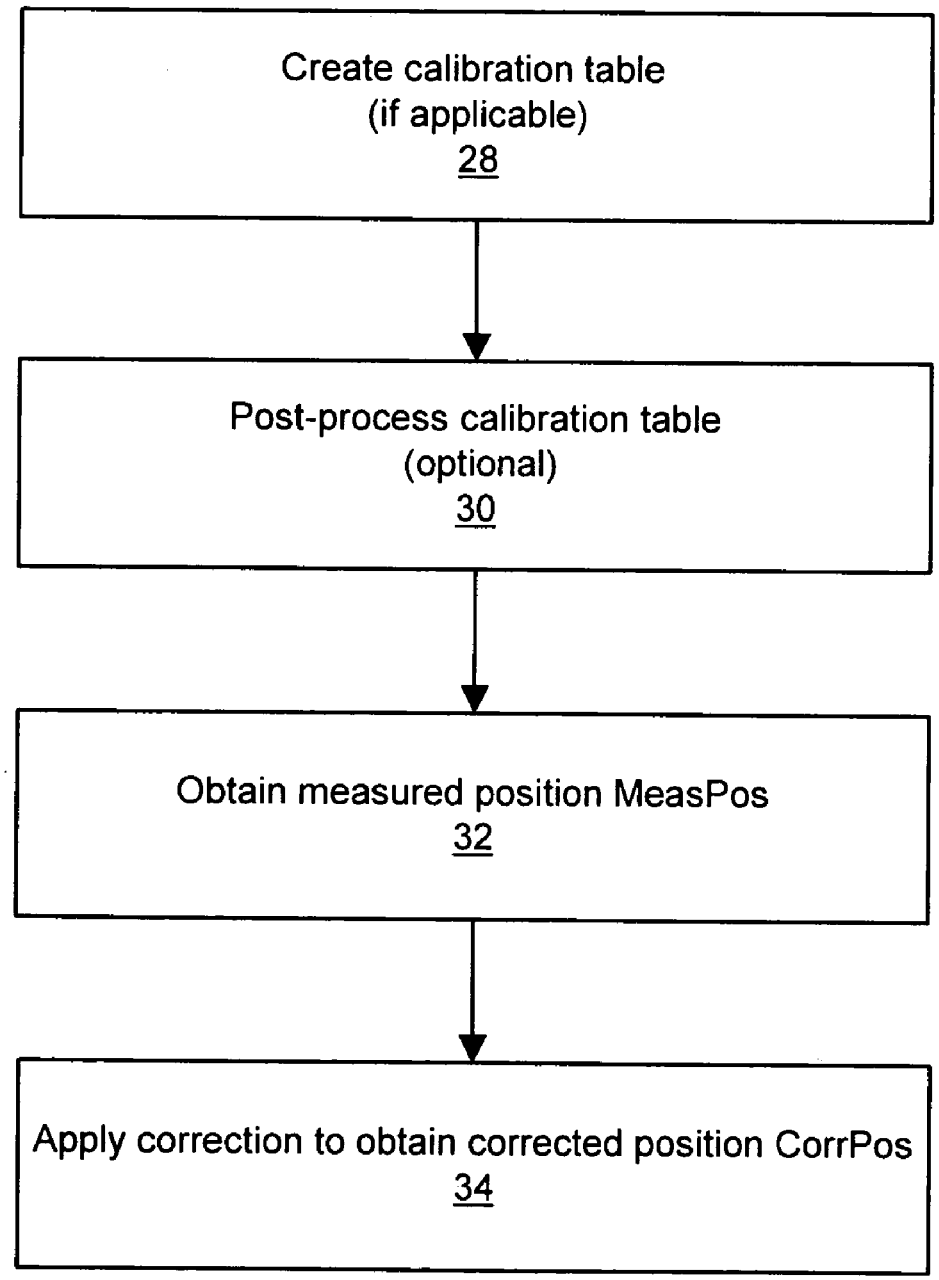
FIG. 4 is a flow diagram generally illustrating a compensation method employed in the optical encoder of FIG. 1 in accordance with the present invention.

FIG. 4 illustrates the general approach to calculating and applying corrections to the encoder position output. In some cases, a calibration table is created in a calibration operation that precedes normal operation of the encoder (step 28). This may be followed by optional post-processing of the calibration table (step 30), examples of which are described below. At step 32, measured position data is obtained during normal operation. At step 34, a correction is applied to the measured position data to obtain corrected position data. If a calibration table is employed, then the correction is based on its contents. When a calibration table is not employed, the measured position data itself is used to calculate a correction value, which is then applied to obtain corrected position data. Examples of such operation are described in more detail below.

In the following description of various specific embodiments, certain notation according to the following definitions is employed:

| | |
|---|---|
| LSB | Minimum angular encoder position that can be measured (radians) |
| Correction point | Points on the scale where scale error is measured |
| Home | Encoder starting position |
| S | Step size between correction points (radians) |
| T | Number of LSB between correction points |
| $\theta A$ | Measured angular position from detector A (radians) |
| $\theta B$ | Measured angular position from detector B (radians) |
| $\theta AVG$ | Average of the two detectors (radians); calculated as $(\theta A + \theta B)/2$ |
| $\Delta$ | Nominal phase difference between $\theta A$ and $\theta B$ due to nominal separation between detectors A and B, modulo $2\pi$. Thus if detector separation is $9.2\pi$, for example, then $\Delta = 9.2\pi - 8\pi = 1.2\pi$ |
| $Err_n$ | Local error slope at correction point "n" on the scale (radians); calculated as $(\theta A_n - \theta B_n) - \Delta$. Note that by definition, $Err_n = 0$ when $(\theta A_n - \theta B_n) = \Delta$. |
| Z | N order polynomial $A + Bx + Cx^2 + Dx^3 + \ldots + (\ )x^n$ |
| $MeasPos_n$ | Measured absolute position relative to Home at correction point n (radians) |
| $ErrSum_n$ | Total accumulated error at correction point n (radians); calculated as $(Err_1 * (2\pi/S)) + (Err_2 * (2\pi/S)) + \ldots + (Err_n * (2\pi/S))$ |

The specific correction algorithms may be implemented using only a real-time correction during encoder operation, or using a calibration step before encoder operation, in which case the corrections during operation are applied from a stored formula or look up table. When a calibration step is used, one of two types of calibration tables may be created:
1. A table of local error slopes at each correction point ($ERR_n$)
2. A table of the total accumulated error over the grating at each correction point ($ErrSum_n$)

Once either type of calibration table is created, the table may be post-processed with any, all, or none of the following functions:
1. A smoothing function may be applied to the data
2. A scale factor may be applied to the data to correct for sensor-to-grating misalignment or detector separation inaccuracy
3. A polynomial curve fit function (Z) may be calculated to replace the measured calibration table For all of the following methods, it is assumed that θAVG is used to determine all encoder position measurements ($MeasPos_n$) during calibration and during operation.

Figure 5:
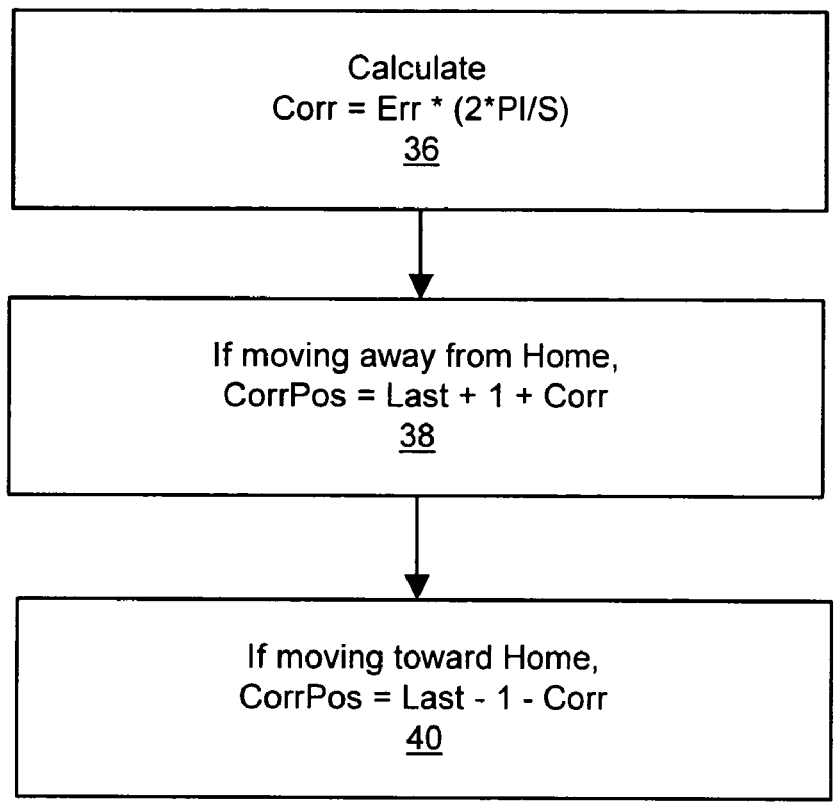
FIGS. 5–12 are flow diagrams illustrating alternative embodiments of the compensation method shown generally in FIG. 4.

Method 1 (Refer to FIG. 5)

There is no calibration operation that precedes normal operation. There is no requirement for a calibration table or other stored parameters.

During operation, position sampling is employed. The following operational parameters are required:
1. Incremental position
2. Direction of travel relative to Home It is required that the step size S be exactly equal to T. Although it would be possible to use this technique with high-resolution encoders, as a practical matter the processing burden of calculating and applying correction at each LSB would be too high. Thus, Method 1 is generally more suitable for use in relatively low-resolution encoders.

The process of FIG. 5 is performed at every correction point during operation. At step 36, the following correction value is calculated:

$$Corr_n = Err_n * (2\pi/S)$$

It is required that the correction value $Corr_n$ not exceed 1 LSB.

At step 38, if the relative movement of the encoder with respect to the scale is away from the Home position, then the corrected position reported by the encoder is equal to the last corrected position (Last) incremented by 1 LSB+$CORR_n$. It is of course necessary for Last to have a defined value at some point on the scale. It may be convenient to define Last at the Home position, for example by assigning the value "0" to it.

At step 40, if the relative movement of the encoder with respect to the scale is towards the Home position, then the corrected position reported by the encoder is equal to the last corrected position (Last) decremented by (1 LSB+$CORR_n$).

Figure 6:
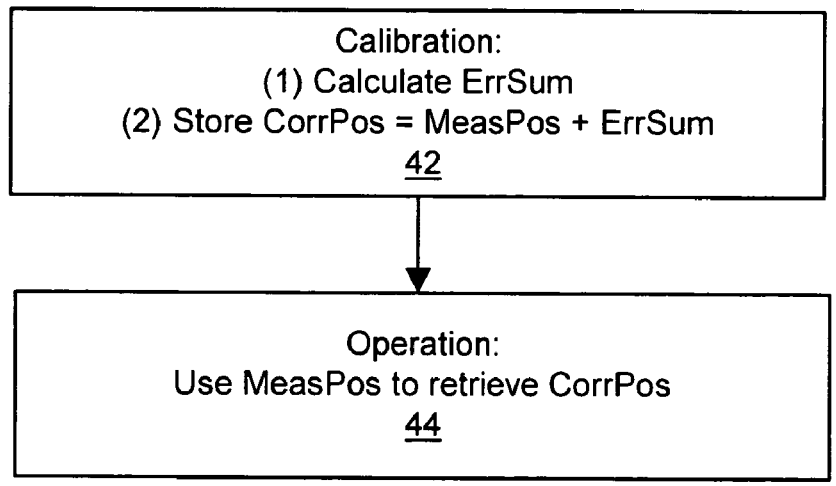

Method 2 (Refer to FIG. 6)

This method employs a pre-operational calibration operation, shown at step 42 of FIG. 6. At each LSB of measured position $MeasPos_n$, the total accumulated error $ErrSum_n$ is calculated, and this value is used to calculate a corrected position value CorrPos as follows:

$$CorrPos_n = MeasPos_n + ErrSum_n$$

Each value $CorrPos_n$ is stored in a look up table indexed by $MeasPos_n$.

Subsequent normal operation of the encoder is straightforward. As shown at step 44, a given measured position $MeasPos_n$ is used to look up the corrected position $CorrPos_n$ in the look up table.

Method 2 can employ time-based sampling, and requires as operational parameters the incremental position and the absolute position relative to Home ($MeasPos_n$). The resolution is generally limited only by the size of the look up table. It is required that $CorrPos_n+1$ be greater than $CorrPos_n$.

Figure 7:
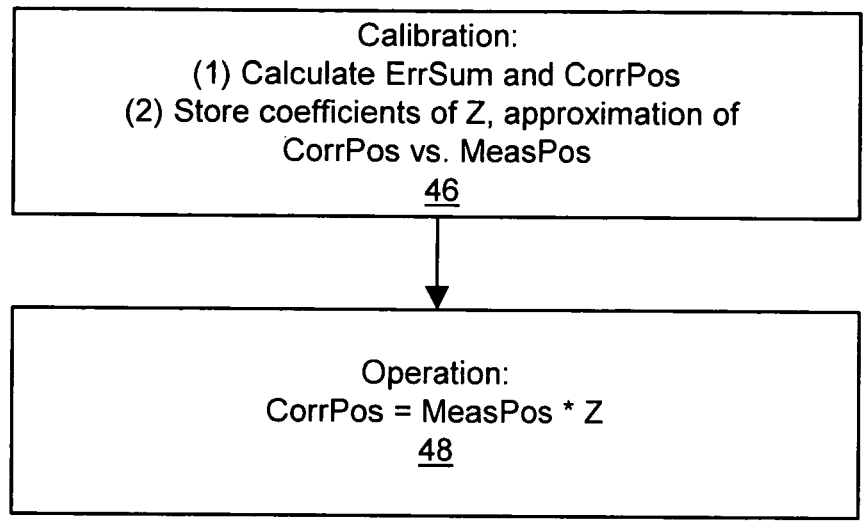

Method 3 (FIG. 7)

This method also employs a pre-operational calibration operation, shown at step 46 of FIG. 7. At each LSB of measured position, the total accumulated error $ErrSum_n$ is calculated, and this value is used to calculate a corrected position value CorrPos as follows:

$$CorrPos_n = MeasPos_n + ErrSum_n$$

Next, a polynomial curve Z is fitted to the set of data representing CorrPos vs. MeasPos. Z is represented by stored coefficients A, B, C, . . . .

As shown at step 48, during operation the corrected position $CorrPos_n$ at every point is calculated as follows:

$$CorrPos = MeasPos_n * Z_n$$

Method 3 can employ time-based sampling, and requires as operational parameters the incremental position and the absolute position relative to Home ($MeasPos_n$). The resolution is generally unlimited. It is required that $CorrPos_n+1$ be greater than $CorrPos_n$.

Figure 8:
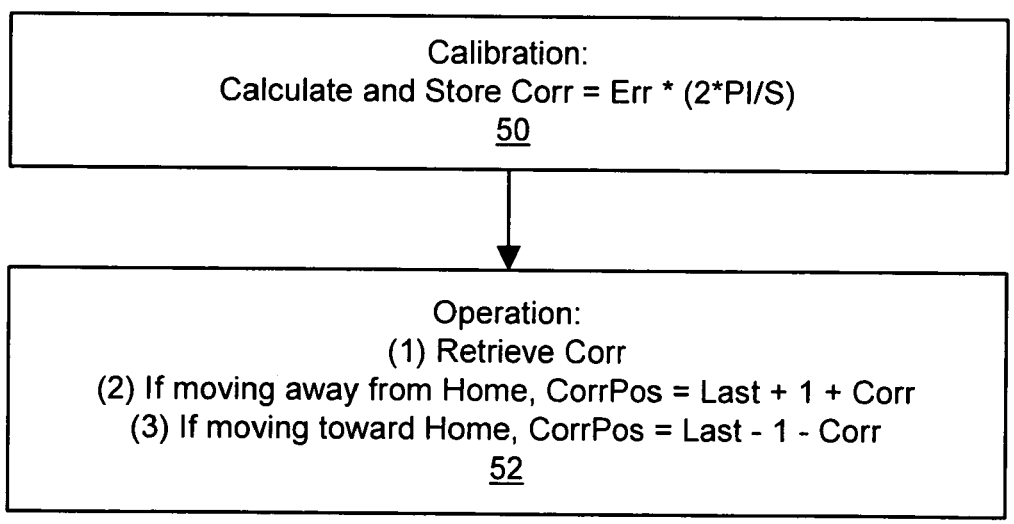

Method 4 (Refer to FIG. 8)

This method is similar to Method 1 except that a calibration operation and calibration table are employed. Notably, the resolution is not limited to the step size S. Position sampling is still required at the correction points, but time-based sampling can be used between correction points. However, corrections are made only at correction points.

During calibration, step 50 of FIG. 8 is performed at every correction point:

$$Corr_n = Err_n * (2\pi/S)$$

The values {$Corr_n$} are saved in the calibration table. As with Method 1, it is required that the correction value $Corr_n$ not exceed 1 LSB.

During operation, as shown at step 52, the value $Corr_n$ is retrieved from the calibration table at each correction point. If the relative movement of the encoder with respect to the scale is away from the Home position, then the corrected position $CorrPos_n$ reported by the encoder is equal to the last position (Last) incremented by 1 LSB+$Corr_n$ at each correction point. As with Method 1, it is necessary for Last to have a defined value at some point on the scale, such as at the Home position. If the relative movement of the encoder with respect to the scale is towards the Home position, then the corrected position $CorrPos_n$ reported by the encoder is equal to the last position (Last) decremented by (1 LSB+$Corr_n$) at each correction point. No corrections are implemented between correction points.

Figure 9:
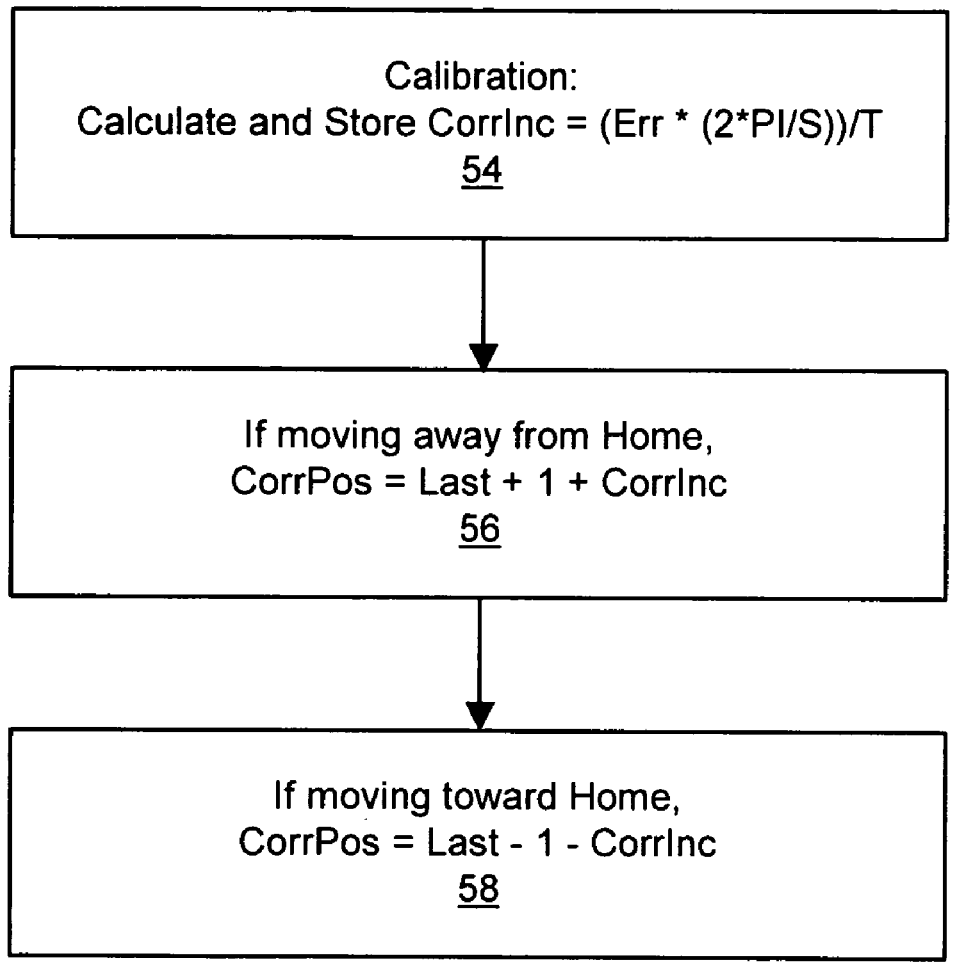

Method 5 (Refer to FIG. 9)

This method is similar to Method 4, but provides for greater correction resolution. The error at each correction point is divided among multiple positions between correction points.

During calibration, step 54 of FIG. 9 is performed at every correction point:

$$CorrInc_n = (Err_n * (2\pi/S))/T$$

The values {CorrInc$_n$} are saved in the calibration table. As with Method 4, it is required that the correction value Corr$_n$ not exceed 1 LSB.

During operation, as shown at step 56, the value CorrInc$_n$ is retrieved from the calibration table at each LSB. If the relative movement of the encoder with respect to the scale is away from the Home position, then the corrected position CorrPos$_n$ reported by the encoder is equal to the last corrected position (Last) incremented by 1 LSB+CorrInc$_n$ for each LSB measured. If the relative movement of the encoder with respect to the scale is towards the Home position, then the corrected position CorrPos$_n$ reported by the encoder is equal to the last corrected position (Last) decremented by (1 LSB+CorrInc$_n$) for each LSB measured.

Figure 10:
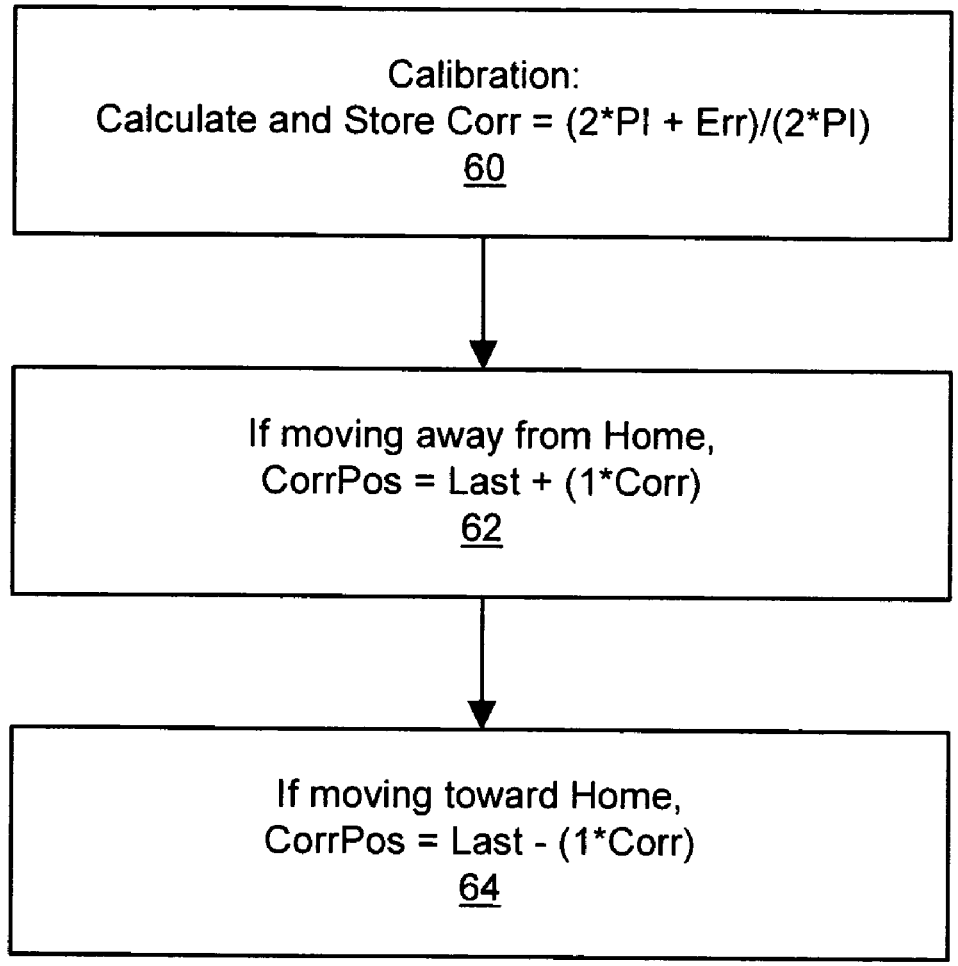

Method 6 (Refer to FIG. 10)

This method is similar to Method 4, except that it employs a multiplicative rather than an additive correction.

During calibration, step 60 of FIG. 10 is performed at every correction point to generate a multiplicative correction:

$$Corr_n = (2\pi + Err_n)/2\pi$$

The values {Corr$_n$} are saved in the calibration table. As with Method 4, it is required that the correction value Corr$_n$ not exceed 1 LSB.

During operation, the value Corr$_n$ is retrieved from the calibration table at each position. As shown at step 62, if the relative movement of the encoder with respect to the scale is away from the Home position, then the corrected position CorrPos$_n$ reported by the encoder is equal to the last corrected position (Last) incremented by (1 LSB* Corr$_n$). As shown at step 64, if the relative movement of the encoder with respect to the scale is towards the Home position, then the corrected position CorrPos$_n$ reported by the encoder is equal to the last corrected position (Last) decremented by (1 LSB*Corr$_n$).

Figure 11:
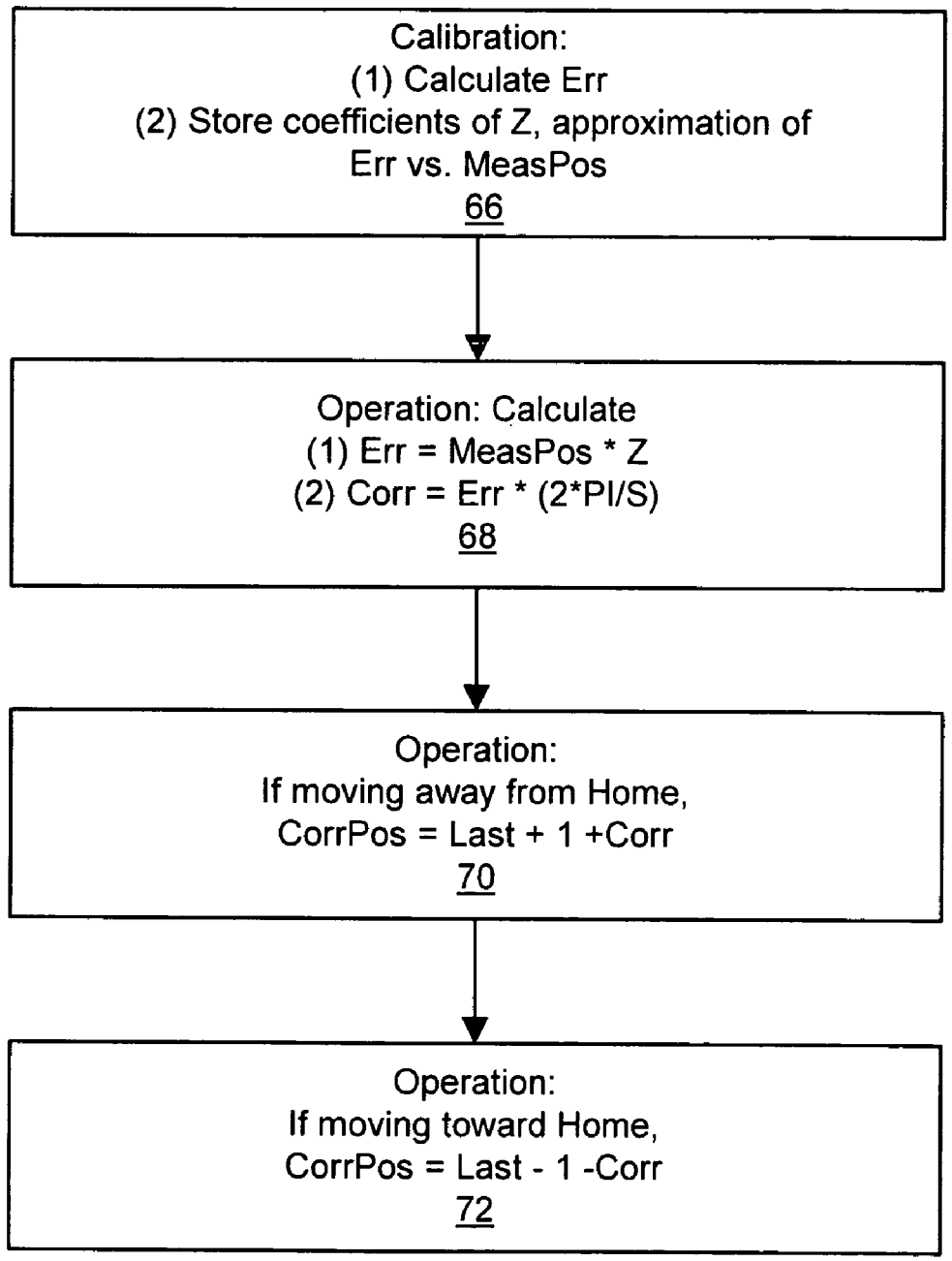

Method 7 (Refer to FIG. 11)

This method is similar to Method 3, but employs the local error slope Err rather than the accumulated error sum ErrSum.

As shown at step 66, at each LSB of measured position, the local error value Err$_n$ is calculated. The result is a set of data for Err vs. MeasPos for all n Next, a polynomial curve Z is fitted to the Err vs. MeasPos data. As noted above, Z is represented by stored coefficients A, B, C, . . . .

As shown at step 68, during operation the error value Err$_n$ is re-created as follows:

$$Err_n = MeasPos_n * Z_n$$

Then a correction value Corr$_n$ is calculated as follows:

$$Corr_n = Err_n * (2\pi/S)$$

At every correction point, as shown at step 70, if the relative movement of the encoder with respect to the scale is away from the Home position, then the corrected position CorrPos$_n$ reported by the encoder is equal to the last position (Last) incremented by 1 LSB+Corr$_n$. If the relative movement of the encoder with respect to the scale is towards the Home position, then the position CorrPos$_n$ reported by the encoder is equal to the last corrected position (Last) decremented by (1 LSB+Corr$_n$). No corrections are implemented between correction points.

Figure 12:
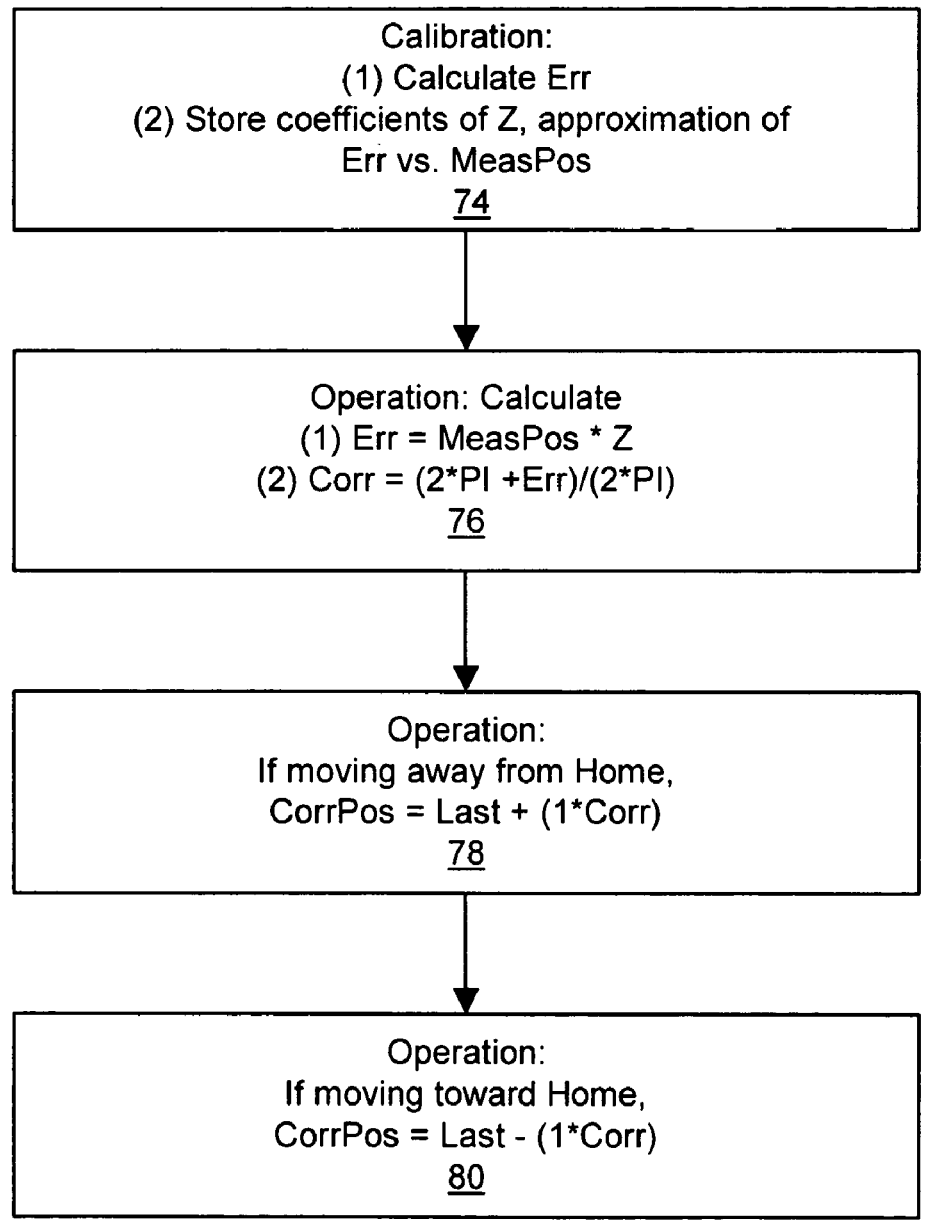

Method 8 (Refer to FIG. 12)

This method is similar to Method 7, but employs a multiplicative rather than an additive correction.

As shown at step 74, at each LSB of measured position, the local error value Err$_n$ is calculated. The result is a set of data for Err vs. MeasPos for all n Next, a polynomial curve Z is fitted to the Err vs. MeasPos data.

As shown at step 76, during operation the error value Err$_n$ is re-created as follows:

$$Err_n = MeasPos_n * Z_n$$

Then a multiplicative correction value Corr$_n$ is calculated as follows:

$$Corr_n = (2\pi + Err_n)/2\pi$$

As shown at step 78, if the relative movement of the encoder with respect to the scale is away from the Home position, then the corrected position CorrPos$_n$ reported by the encoder is equal to the last corrected position (Last) incremented by (1 LSB* Corr$_n$). If the relative movement of the encoder with respect to the scale is towards the Home position, then the corrected position CorrPos$_n$ reported by the encoder is equal to the last corrected position (Last) decremented by (1 LSB*Corr$_n$).

It should be noted that in the disclosed technique the effective separation between the detector sections 20 and 22 is generally not known a priori to within a desired absolute measurement accuracy. In a given embodiment, a nominal detector separation is established by design in order to set the sensitivity or spatial frequency response of the error correction process. This nominal separation may be a small number of periods of the interference pattern, as described above. However, even if the two sections 20 and 22 are precisely spaced on a single detector die, their effective separation can be influenced by sensor-to-grating misalignment, sensor optical errors, and other influences. The uncertainty in the effective separation can appear as a constant linear error over the length of the grating.

For purposes of the disclosed error correction technique, the error can be addressed in one of multiple ways. In embodiments having relatively low resolution, it may be possible to simply ignore the error, assuming that the uncertainty is limited to less than the error correction resolution. In embodiments of higher resolution, the system can be calibrated in some fashion to remove as much of the error as possible. For example, an interferometer can be used to measure a scale at points widely separated points, such as at 0 and 1 meters on a 1+ meter scale. In this process, the scale is known to be highly accurate and is mounted a controlled fixture where the sensor and grating are known to be aligned to each other within an acceptable tolerance. If the sensor reads an amount other than exactly 1 meter, then the correction factors are adjusted by a corresponding amount. For example, if the sensor reads 0.98 meters or 1.03 meters then every correction factor calculated by the methods described above is multiplied by 1.02 (the inverse of 0.98) or 0.97 (inverse of 1.03) respectively. This correction can be done as part of a factory calibration or as part of customer installation of the encoder.

Although the disclosed compensation technique is described in use with an interferometric optical encoder in particular, it may also be used with encoders of other types that also generate spatially periodic patterns that are detected by a corresponding detector. For example, the technique can be used with magnetic encoders in which the scale consists of an array of spaced magnetic elements. Other examples include optical encoders using geometric optics; inductive encoders; capacitive encoders; and encoders that employ eddy current sensing. It will be appreciated that in such alternative embodiments the scale comprises an array of elements of the corresponding type (i.e., inductors, capacitors, etc.) rather than a ruled grating as is used optical encoders.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. An encoder, comprising:
   a scale operative to produce a spatially periodic pattern; and
   a multi-section detector configured to detect multiple periods of the spatially periodic pattern, the detector comprising spatially separated first and second sections, the detector sections generating respective sets of detector output signals; and
   a signal processor operative in response to the detector output signals to:
   (i) derive first and second measured phase values for the first and second detector sections respectively, the measured phase values being indicative of an uncorrected estimate of the position of the scale with respect to the detector;
   (ii) calculate a position error value based on the difference between the first and second measured phase values;
   (iii) calculate a compensation value from the position error value; and
   (iv) combine the compensation value with at least one of the first and second measured phase values to produce a corrected estimate of the position of the scale with respect to the detector.

2. An encoder according to claim 1, wherein the signal processor is operative to perform steps (ii)–(iv) on the fly during normal operation of the encoder.

3. An encoder according to claim 2, wherein the signal processor is further operative:
   in step (ii), calculate a position error value by calculating the difference between the first and second measured phase values;
   in step (iii), to calculate a compensation value by multiplying the position error value by $2\pi/S$, where S is a step size equal to the phase interval between adjacent correction points of the scale; and
   in step (iv), to produce the corrected estimate of the scale position at a given correction point (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

4. An encoder according to claim 3, wherein the signal processor is further operative:
   in step (ii), to calculate the position error value by subtracting $\Delta$ from the calculated difference between the first and second measured phase values, wherein $\Delta$ represents a nominal phase separation modulo $2\pi$ between the first and second sections of the detector.

5. An encoder according to claim 1, wherein the signal processor is further operative:
to perform steps (i)–(iii) during a calibration operation preceding normal operation of the encoder, the calibration operation producing a table of compensation values reflecting respective position error values for respective correction points of the scale; and
   in step (iv), to retrieve, at each correction point during normal operation of the encoder, a corresponding compensation value from the table.

6. An encoder according to claim 5, wherein the signal processor is further operative:
   in step (ii), to calculate the position error value by calculating the difference between the first and second measured phase values;
   in step (iii), to calculate the compensation value by multiplying the position error value by $2\pi/S$, where S is a step size equal to the phase interval between adjacent correction points of the scale; and
   in step (iv), to produce the corrected estimate of the scale position at a given correction point (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

7. An encoder according to claim 5, wherein the signal processor is further operative:
   in step (ii), to calculate the position error value by calculating the difference between the first and second measured phase values;
   in step (iii), to calculate the compensation value by multiplying the position error value by $(2\pi/S)/T$, where S is a step size equal to the phase interval between adjacent correction points of the scale, and T is the number of least significant bits of encoder resolution between adjacent correction points; and
   in step (iv), to produce the corrected estimate of the scale position at a given least significant bit (LSB) (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

8. An encoder according to claim 5, wherein the signal processor is further operative:
   in step (ii), to calculate the position error value by calculating the difference between the first and second measured phase values;
   in step (iii), to calculate the compensation value as the sum of (the position error value and $2\pi$) divided by $2\pi$; and
   in step (iv), to produce the corrected estimate of the scale position at each least significant bit (LSB) (1) when the scale position is moving away from a home position, by incrementing an immediately preceding estimate of the scale position by a value equal to the product of one least significant bit and the compensation value, and (2) when the scale position is moving towards the home position, by decrementing the immediately preceding estimate of the scale position by a value equal to the product of one least significant bit and the compensation value.

9. An encoder according to claim 1, wherein the signal processor is further operative to perform steps (i)–(iii) during a calibration operation preceding normal operation of the encoder, and to calculate the compensation value in step (iii) for a given correction point as a cumulative error value by summing the position error values from all correction points between a home position and the given correction point.

10. An encoder according to claim 9, wherein the signal processor is further operative (1) during the calibration operation, to produce a table of corrected estimates of the scale position as a function of measured positions of the scale position, and (2) during normal operation, at each of a set of measured scale positions, to retrieve the corresponding corrected estimate of the scale position from the table.

11. An encoder according to claim 9, wherein the signal processor is further operative (1) during the calibration operation, to produce data representing a function Z which is a curve-fit approximation of corrected estimates of the scale position as a function of measured positions of the scale position, and (2) during normal operation, at each of a set of measured scale positions, to multiply the measured scale position by a corresponding value of Z.

12. An encoder according to claim 1, wherein the signal processor is further operative:
during a calibration operation preceding normal encoder operation, to produce data representing a function Z which is a curve-fit approximation position error values as a function of measured positions of the scale position; and
during normal operation, at each of a set of measured scale positions:
to produce a re-created position error value by multiplying the measured scale position by a corresponding value of Z;
in step (iii), to calculate the compensation value by multiplying the re-created position error value by $2\pi/S$, where S is a step size equal to the phase interval between adjacent correction points of the scale; and
in step (iv), to produce the corrected estimate of the scale position at a given correction point (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

13. An encoder according to claim 1, wherein the signal processor is further operative:
during a calibration operation preceding normal encoder operation, to produce data representing a function Z which is a curve-fit approximation position error values as a function of measured positions of the scale position; and
during normal operation at each of a set of measured scale positions:
to produce a re-created position error value by multiplying the measured scale position by a corresponding value of Z;
in step (iii), to calculate the compensation value by multiplying the re-created position error value by the sum of (the position error value and $2\pi$) divided by $2\pi$; and
in step (iv), to produce the corrected estimate of the scale position at each least significant bit (LSB) (1) when the scale position is moving away from a home position, by incrementing an immediately preceding estimate of the scale position by a value equal to the product of one least significant bit and the compensation value, and (2) when the scale position is moving towards the home position, by decrementing the immediately preceding estimate of the scale position by a value equal to the product of one least significant bit and the compensation value.

14. An encoder according to claim 1, wherein the first and second detector sections partially overlap.

15. An encoder according to claim 14, wherein the overlapping portions of the first and second detector sections are interleaved with each other.

16. An encoder according to claim 1, wherein the spatially periodic pattern is a spatially periodic optical interference pattern, and wherein the encoder is an optical encoder including an optical source operative to direct optical energy at the scale to produce the spatially periodic optical interference pattern.

17. An encoder according to claim 1, wherein the spatially periodic pattern is a spatially periodic magnetic field pattern, and wherein the encoder is a magnetic encoder in which the scale comprises an array of magnetic elements collectively operative to produce the spatially periodic magnetic field pattern.

18. An encoder according to claim 1, wherein each of the detector sections is a polyphase detector operative to detect respective intra-period phase components of the spatially periodic pattern, and wherein the signal processor is operative, when deriving each of the first and second measured phase values for the respective detector section, to perform a trigonometric calculation based on the respective intra-period phase components.

19. An encoder according to claim 18, wherein the number of intra-period phase components detected by each of the detector sections is four.

20. An encoder according to claim 18, wherein the detector sections are nominally separated by one or more whole periods of the spatially periodic pattern.

21. A method of compensating for spatially varying position errors in a scale of an encoder, the scale being operative to produce a spatially periodic pattern, the method comprising:
(i) providing a multi-section detector configured to detect multiple periods of the spatially periodic pattern, the detector comprising first and second spatially separated sections, the first and second sections generating respective sets of output signals;
(ii) deriving first and second measured phase values for the first and second detector sections respectively, the measured phase values being indicative of an uncorrected estimate of the position of the scale with respect to the detector;
(iii) calculating a position error value based on the difference between the first and second measured phase values;
(iv) calculating a compensation value from the position error value; and (v) combining the compensation value with at least one of the first and second measured phase values to produce a corrected estimate of the position of the scale with respect to the detector.

22. A method according to claim 21, wherein steps (iii)–(v) are performed on the fly during normal operation of the encoder.

23. A method according to claim 22, wherein:
calculating a position error value in step (iii) comprises calculating the difference between the first and second measured phase values;
calculating a compensation value in step (iv) comprises multiplying the position error value by $2\pi/S$, where S is a step size equal to the phase interval between adjacent correction points of the scale; and
in step (v), the corrected estimate of the scale position at a given correction point is produced (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

24. A method according to claim 23, wherein calculating a position error value in step (iii) comprises subtracting $\Delta$ from the calculated difference between the first and second measured phase values, wherein $\Delta$ represents a nominal phase separation modulo $2\pi$ between the first and second sections of the detector.

25. A method according to claim 21, wherein:
steps (ii)–(iv) are performed during a calibration operation preceding normal operation of the encoder, the calibration operation producing a table of compensation values reflecting respective position error values for respective correction points of the scale; and
step (v) includes retrieving, at each correction point during normal operation of the encoder, a corresponding compensation value from the table.

26. A method according to claim 25, wherein:
calculating a position error value in step (iii) comprises calculating the difference between the first and second measured phase values;
calculating a compensation value in step (iv) comprises multiplying the position error value by $2\pi/S$, where S is a step size equal to the phase interval between adjacent correction points of the scale; and
in step (v), the corrected estimate of the scale position at a given correction point is produced (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

27. A method according to claim 25, wherein:
calculating a position error value in step (iii) comprises calculating the difference between the first and second measured phase values;
calculating a compensation value in step (iv) comprises multiplying the position error value by $(2\pi/S)/T$, where S is a step size equal to the phase interval between adjacent correction points of the scale, and T is the number of least significant bits of encoder resolution between adjacent correction points; and
in step (v), the corrected estimate of the scale position at each least significant bit (LSB) is produced (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

28. A method according to claim 25, wherein:
calculating a position error value in step (iii) comprises calculating the difference between the first and second measured phase values;
the compensation value calculated in step (iv) is equal to the sum of (the position error value and $2\pi$) divided by $2\pi$; and
in step (v), the corrected estimate of the scale position at each least significant bit (LSB) is produced (1) when the scale position is moving away from a home position, by incrementing an immediately preceding estimate of the scale position by a value equal to the product of one least significant bit and the compensation value, and (2) when the scale position is moving towards the home position, by decrementing the immediately preceding estimate of the scale position by a value equal to the product of one least significant bit and the compensation value.

29. A method according to claim 21, wherein steps (ii)–(iv) are performed during a calibration operation preceding normal operation of the encoder, and the compensation value calculated in step (iv) for a given correction point is a cumulative error value calculated by summing the position error values from all correction points between a home position and the given correction point.

30. A method according to claim 29, wherein the calibration operation produces a table of corrected estimates of the scale position as a function of measured positions of the scale position, and further comprising, during normal operation at each of a set of measured scale positions, retrieving the corresponding corrected estimate of the scale position from the table.

31. A method according to claim 29, wherein the calibration operation produces data representing a function Z which is a curve-fit approximation of corrected estimates of the scale position as a function of measured positions of the scale position, and further comprising, during normal operation at each of a set of measured scale positions, multiplying the measured scale position by a corresponding value of Z.

32. A method according to claim 21, further comprising performing a calibration operation preceding normal encoder operation to produce data representing a function Z which is a curve-fit approximation position error values as a function of measured positions of the scale position, and further comprising, during normal operation at each of a set of measured scale positions:
producing a re-created position error value by multiplying the measured scale position by a corresponding value of Z;
in step (iv), calculating the compensation value by multiplying the re-created position error value by $2\pi/S$, where S is a step size equal to the phase interval between adjacent correction points of the scale; and in step (v), producing the corrected estimate of the scale position at a given correction point (1) when the scale position is moving away from a home position, by incrementing an immediately preceding estimate of the scale position by a value equal to the sum of one least significant bit plus the compensation value, and (2) when the scale position is moving towards the home position, by decrementing the immediately preceding estimate of the scale position by a value equal to the sum of one least significant bit plus the compensation value.

33. A method according to claim 21, further comprising performing a calibration operation preceding normal encoder operation to produce data representing a function Z which is a curve-fit approximation position error values as a function of measured positions of the scale position, and further comprising, during normal operation at each of a set of measured scale positions:
   producing a re-created position error value by multiplying the measured scale position by a corresponding value of Z;
   in step (iv), calculating the compensation value by multiplying the re-created position error value by the sum of (the position error value and $2\pi$) divided by $2\pi$; and
   in step (v), producing the corrected estimate of the scale position at each least significant bit (LSB) (1) when the scale position is moving away from a home position, by incrementing an immediately preceding estimate of the scale position by a value equal to the product of one least significant bit and the compensation value, and (2) when the scale position is moving towards the home position, by decrementing the immediately preceding estimate of the scale position by a value equal to the product of one least significant bit and the compensation value.

34. A method according to claim 21, wherein each of the detector sections is a polyphase detector operative to detect respective intra-period phase components of the spatially periodic pattern, and wherein deriving each of the first and second measured phase values for the respective detector section includes performing a trigonometric calculation based on the respective intra-period phase components.

35. A method according to claim 34, wherein the number of intra-period phase components detected by each of the detector sections is four.

36. A method according to claim 34, wherein the detector sections are nominally separated by one or more whole periods of the spatially periodic pattern.

* * * * *